Sept. 27, 1949.  R. B. COTTRELL  2,483,184
TRUCK
Filed Sept. 5, 1946  3 Sheets-Sheet 1

INVENTOR.
Robert B. Cottrell
BY
Arvin O. B. Garner
Atty.

Sept. 27, 1949. R. B. COTTRELL 2,483,184
TRUCK
Filed Sept. 5, 1946 3 Sheets-Sheet 2
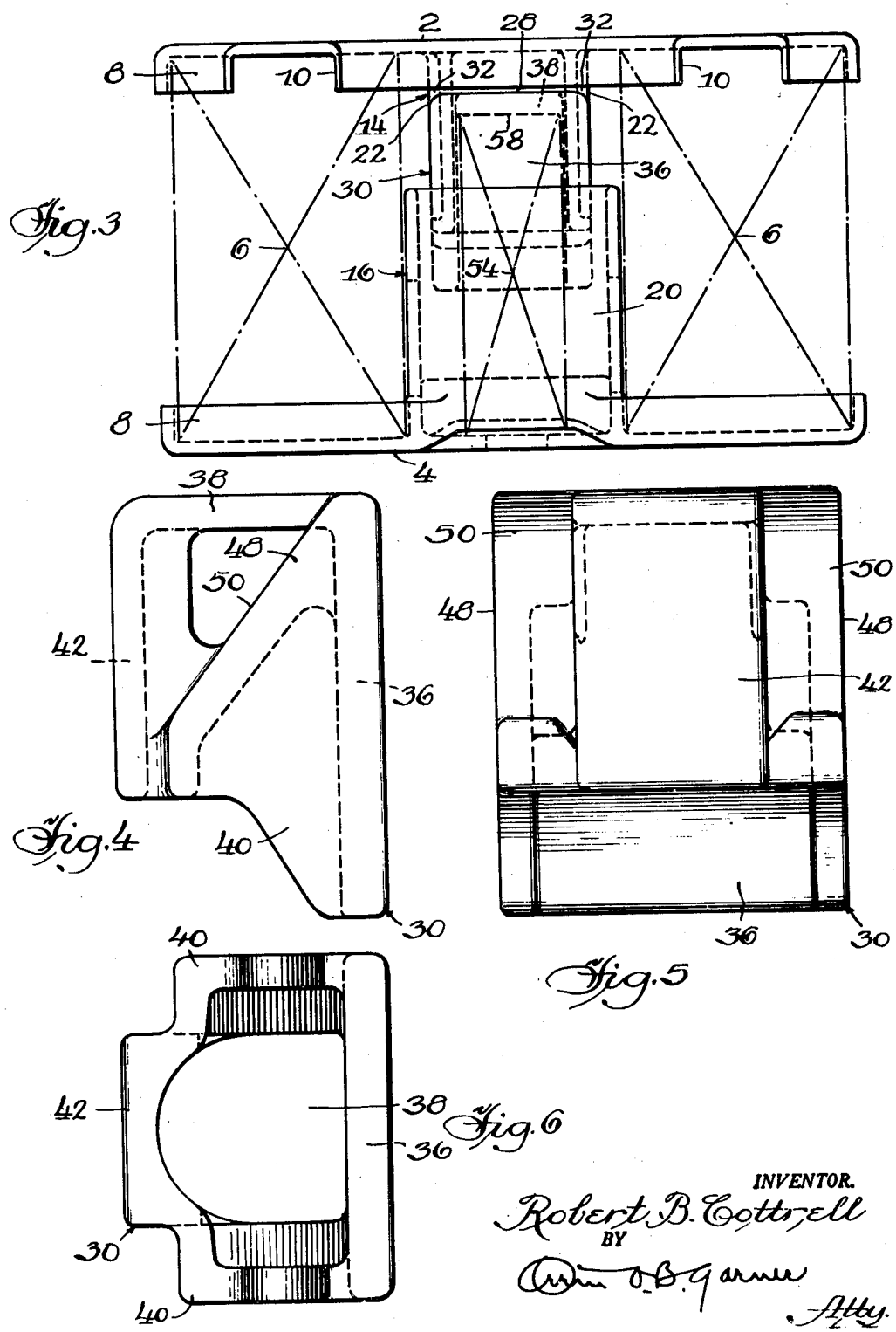
INVENTOR.
Robert B. Cottrell
BY
Arin B. Garner
Atty.

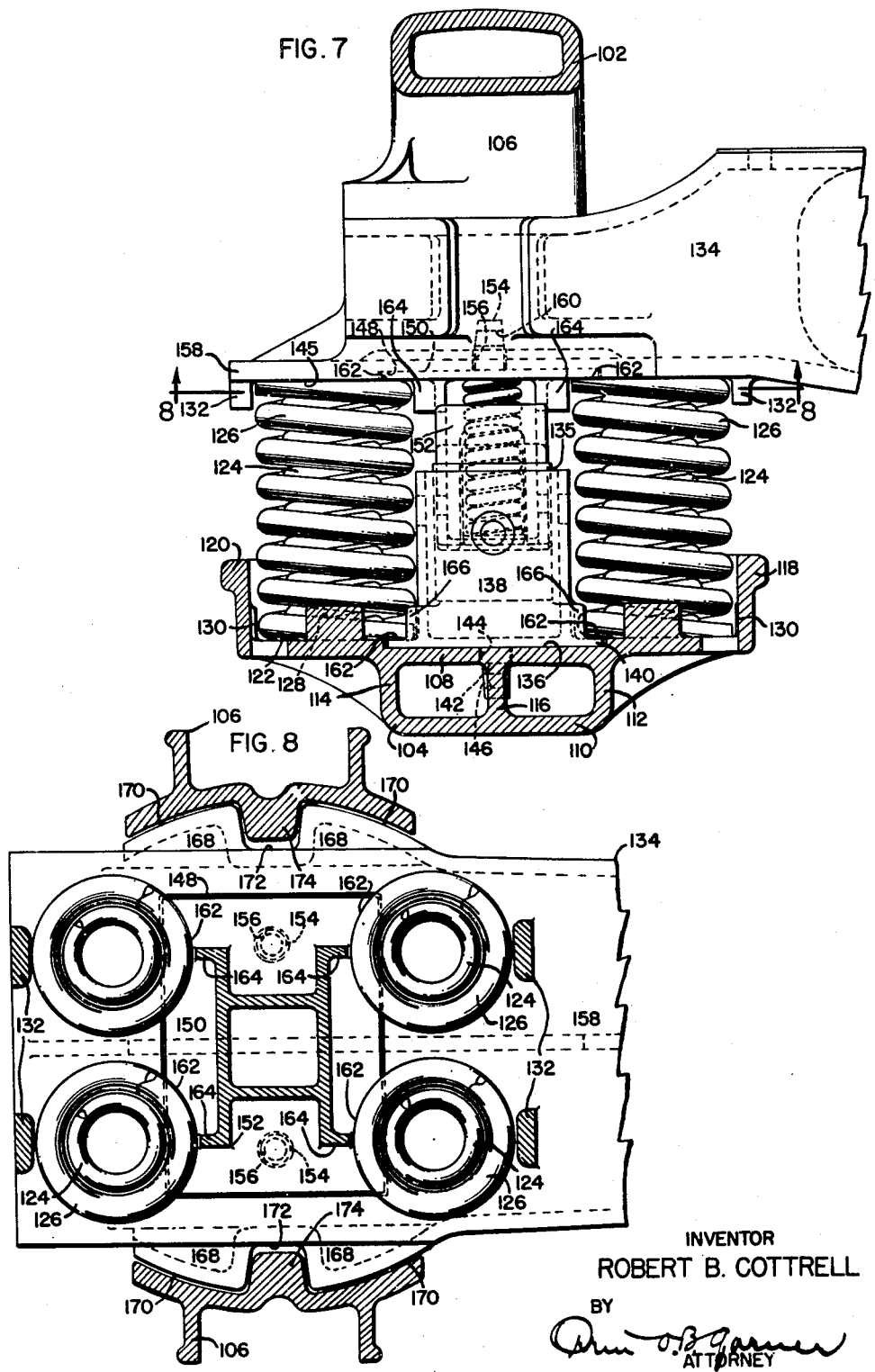

Patented Sept. 27, 1949

2,483,184

UNITED STATES PATENT OFFICE 2,483,184

TRUCK

Robert B. Cottrell, Chicago, Ill., assignor to American Steel Foundries, Chicago, Ill., a corporation of New Jersey Application September 5, 1946, Serial No. 694,915

7 Claims. (Cl. 267—9)

1

This application is a continuation in part of my copending application for Spring group, Serial No. 618,009, filed in the United States Patent Office, September 22, 1945, now abandoned.

My invention relates to a spring group for a railway car truck and more particularly to a spring group of the type incorporating a friction device of novel form for snubbing the oscillations of the coil springs.

The general object of my invention is to provide such a group wherein the firction device develops uniform friction in both closing and release to thereby provide a constant amount of friction to dampen the synchronous oscillations of the coil springs and prevent resonance.

Another object of my invention is to provide a spring group incorporating a friction device comprising telescoping followers, one of said followers presenting friction faces at opposite ends thereof adjacent a pair of spaced wedge surfaces at each end of the other follower, said first-mentioned follower supporting resilient means extending between the surfaces of each pair at each end of the second-mentioned follower for actuating friction shoes into complementary engagement with respective pairs of wedge surfaces and into frictional engagement with the friction faces, relative movement of said followers effecting a variation in the amount of friction afforded by said frictional engagement.

A further object of my invention is to devise a structure such as described wherein the friction device comprises a housing follower presenting opposed vertical internal friction surfaces and a wedge follower presenting spaced external diagonal surfaces adjacent each friction surface, a friction shoe having complementary engagement with each friction surface and the adjacent wedge surfaces and receiving therewithin a coil spring extending between the wedge surfaces and compressed between the shoe and the housing follower.

My invention comprehends the wedge follower of novel form comprising a horizontal wall and spaced depending substantially parallel side walls merging therewith and connected by a transverse wall extending therebetween, said side walls presenting substantially coplanar wedge surfaces at each of the opposite ends thereof for engagement with associated friction shoes.

My invention also contemplates a reversible snubbing unit such as hereinabove described suitable for insertion in a railway car truck between the bolster-supporting spring group thereof for

2 dampening synchronous spring oscillations, said unit comprising telescoping followers, one of which may seat against the bolster and the other against the side frame spring seat therebeneath, said springs also abutting against certain portions of the seating bases of said followers for urging said followers apart and maintaining said followers in their respective positions, namely against said bolster and said spring seat, and auxiliary securing means on said followers for securing the same to the truck frame spring seat and bolster respectively.

Other various novel features of the invention will be apparent from the following description and drawings and will be particularly pointed out in the appended claims.

In the drawings:

Figure 3 is a side view of the spring group;

Figures 4, 5 and 6 are views of one of the friction shoes utilized in my novel friction device, Figure 4 being a side view thereof, Figure 5 being a view looking toward the right of Figure 4, and Figure 6 being a bottom view thereof;

Figure 1:
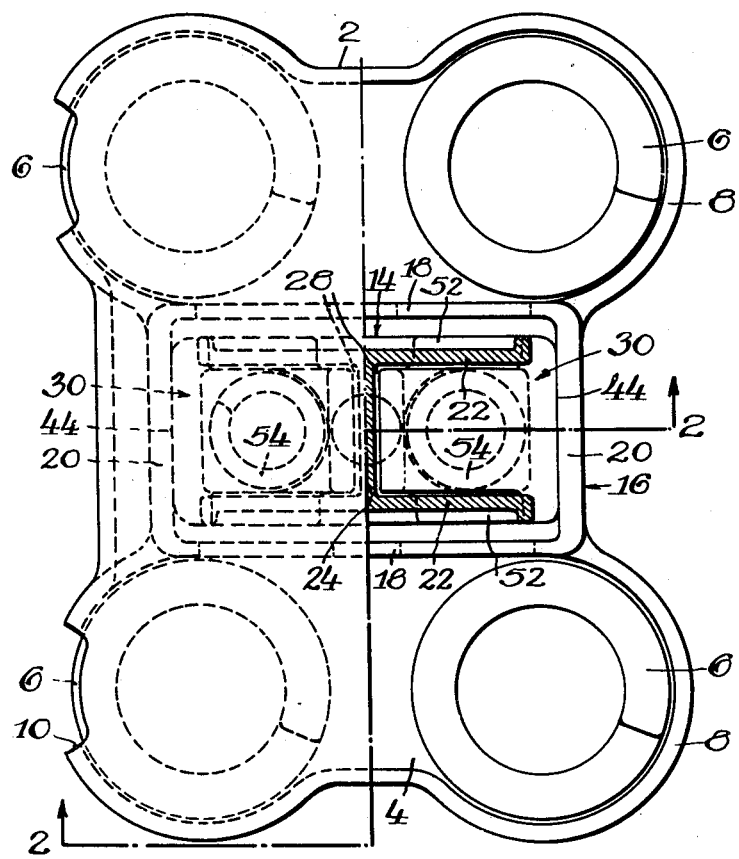
Figure 1 is a top plan view of a spring group embodying one form of my novel type of friction device, partly in section, said section being taken along the line 1—1 of Figure 2.

Figure 7 is a sectional view through a truck structure, the section being taken approximately in the vertical plane bisecting the truck transversely, the bolster, the bolster-supporting spring group, and my novel invention, however, being shown in side elevation; and Figure 8 is a sectional view taken along the transverse horizontal plane substantially as indicated by the line 8—8 of Figure 7 looking in the direction of the arrows and showing the seating arrangement of the bolster-supporting springs.

Describing my invention in detail, the spring group may comprise a top spring plate 2 and a bottom spring plate 4 and the marginal end portions of said plates may have a scalloplike contour in order conveniently to conform to the pairs of long travel coil springs at opposite ends of the group and confined between said plates, said springs being diagrammatically indicated at 6, 6. Each of said plates may have flanges inturned as at 8, 8 for positioning the springs 6, 6, the flange on the plate 2 being discontinuous as at 10, 10 in order to lighten the plates and to facilitate drainage or permit the escape of any other included extraneous matter from the bottom plate which may have a central opening 12 therein for a similar purpose.

Centrally of the group and between the pairs of coil springs at opposite ends thereof may be disposed my novel friction device comprising a top follower 14 in telescoping relationship with a bottom follower 16, said top and bottom followers 14 and 16 being formed integral with the top and bottom spring plates 2 and 4 respectively. The bottom follower 16 is a rectangular boxlike structure comprising the spaced side walls 18, 18 merging at opposite ends thereof with the end walls 20, 20, said walls merging with the bottom wall 21 which may be formed as an integral portion of the spring plate 4 as clearly shown in the drawings. The walls 18, 18 are formed with openings, as illustrated in Figure 2, for convenient foundry practice.

The top follower 14 is a substantially wedge shaped member comprising spaced parallel substantially identical side walls 22, 22 and a transverse wall 24 extending between and connecting the same, all of said walls being vertically disposed and merging with a top horizontal wall 26 formed as an integral portion of the spring plate 2. It may be noted that the structure of the top follower provides a pocket 28 at each side thereof defined by the top wall 26, the side walls 22, 22 and the transverse wall 24, each of the pockets 28, 28 receiving therewithin one of a pair of identical friction shoes 30, 30 for a purpose hereinafter described.

Figure 2:
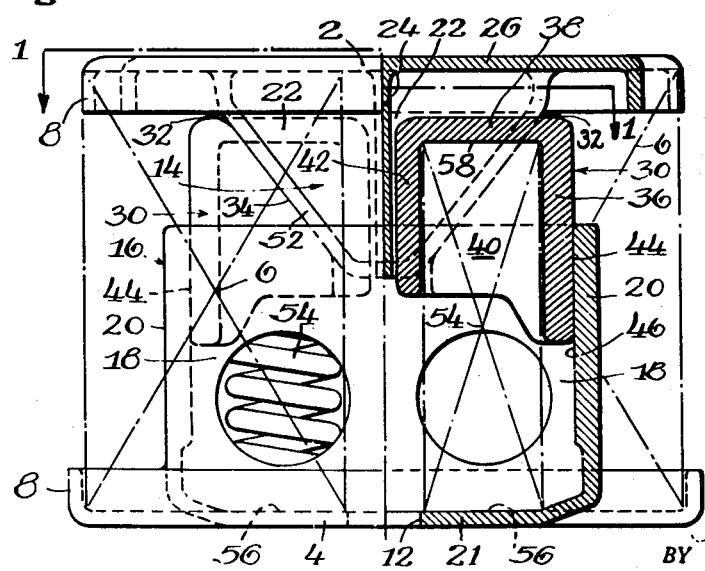
Figure 2 is an end view, partly in section, of the structure shown in Figure 1, the section being taken along the line 2—2 of Figure 1 in a transverse vertical plane bisecting the group.

As will be seen from a consideration of Figure 2, each side wall is substantially triangular or wedge shaped in form with said walls receiving therebetween said shoes 30, 30 and presenting spaced substantially coplanar reversely arranged diagonal surfaces 32, 32 at each of the corresponding ends thereof for engagement as at 34, 34 with the friction shoes 30, 30 externally of pockets 28, 28.

One of the identical friction shoes 30, 30 is shown in detail in Figures 4-6 inclusive, and said shoe is a cuplike structure comprising a friction wall 36, a top wall 38, spaced side walls 40, 40 and a rear wall 42, said friction wall 36 having engagement as at 44 with a friction surface 46 on the adjacent end wall 20 of the bottom follower 16. The spaced side walls 40, 40 of each shoe are formed to provide outwardly disposed ledges or wing portions 48, 48 presenting spaced substantially coplanar wedge surfaces 50, 50 in complementary engagement as at 34, 34 with the adjacent pair of diagonal surfaces 32, 32 on the walls 22, 22 of the top follower. To provide a greater area of contact between the bearing surfaces of the walls 22, 22 of the top follower and the shoes, each of said walls 22, 22 may be provided with a laterally and outwardly projecting flange 52 at each end thereof providing a portion of the diagonal surface 32 on said wall. The flanges 52 on each side wall 22 are engageable (as best seen in Figure 1) with the adjacent wall 18 to limit relative lateral movement between the followers.

Referring now to Figure 2, a pair of coil springs 54, 54 may be seated as at 56, 56 on the wall 21 of the bottom follower at each end thereof, one of said springs 54, 54 being shown in full lines and the other spring being diagrammatically shown in order to more clearly illustrate the detail of the friction parts. Each spring 54 is arranged to support one of the friction shoes 30, 30 to maintain the same in engagement with a pair of the surfaces 32, 32 of the top follower and the adjacent friction surface 46 on the bottom follower and for this purpose extends upwardly of the wall 21 of the bottom follower and between the side walls 22, 22 of the top follower and within the associated shoe 30 for engagement as at 58 with the top wall 38 thereof. From a consideration of Figure 1 it will be noted that each spring 54 is of a diameter such as will permit the spring to be conveniently accommodated in the space between the walls 22, 22 of the top follower, thereby affording a spring 54 of maximum capacity.

It will be apparent that the closure stroke of the device and relative approach of the top and bottom spring plates will cause the springs 54, 54 to be compressed between the shoes and the bottom follower with the result that the wedge follower 14 will urge the shoes downwardly and outwardly along the diagonal surfaces at each end of said follower and into frictional engagement with the friction surfaces at opposite ends of the bottom follower 16. Due to this action just described, a greater amount of friction will be developed upon the closure stroke of the device than on the release stroke thereof inasmuch as the springs 54, 54 will be compressed between the shoes and bottom follower on the closure stroke to thereby urge the friction shoes with a considerably greater degree of force into wedge engagement with the top follower and into frictional engagement with the friction surfaces on the bottom follower.

In the assembly of the spring group, a pair of the springs 6, 6 may be positioned on the bottom spring plate at each end thereof and thereafter the shoe-actuating coil springs 54, 54 may be inserted within the bottom follower and seated on the wall 21 thereof. The shoes may then be inserted within the bottom follower and positioned on the springs 54, 54 by inserting the springs in the respective shoes with the upper end of each spring in engagement with the top wall 38 of the associated shoes, the shoes being disposed so that the friction surfaces thereof engage the friction surfaces on the bottom follower. Thereafter the wedge follower 14 on the spring plate 2 can be positioned between the shoes and the spaced side walls of the bottom follower for engagement of the pair of wedge surfaces 32, 32 on the side walls 22, 22 of the top follower at opposite ends thereof with the wedge surfaces on the shoes.

Referring now to Figures 7 and 8, the modification of my invention is illustrated in connection with the side frame and the bolster of a railway car truck, said side frame comprising a compression member 102, a tension member 104 and columns 106 connecting the compression and tension members and defining with said members the usual bolster opening which may be widened at the top thereof for easy removal of the bolster from the side frame, as will be apparent to those skilled in the art.

Beneath the bolster opening, the tension member 104 is of box section, comprising top and bottom chords 108 and 110, inboard and outboard webs 112 and 114 and the center web 116 interposed between said webs 112 and 114, said top chord being widened and formed with upstanding inboard and outboard flanges 118 and 120 defining a spring seat 122.

A spring group including a plurality of sets of springs, each set comprising an inner spring 124 and an outer spring 126, is seated on the seat 122 and is held in position thereon by the cooperative relationship of the upstanding lugs 128, 128 of the seat and lugs 130, 130 of the inboard and outboard flanges 118 and 120 surrounding said spring group to position the same for cooperation with the downwardly projecting lugs 132, 132 of the bolster 134 and the spring seat 122.

Between the springs 126, 126 may be positioned the reversible ride control or friction unit generally indicated at 135, said unit being similar in construction to that described.

The spring seat 122 may be recessed centrally thereof as at 136 in which may seat the bottom follower 138 which is identical in construction to that previously described with the exception that the bottom wall or base 140 thereof fits into the recess 136.

On the bottom wall 140 may be provided the spaced downwardly projecting dowels or studs 142, each of said studs extending through an opening 144 formed within the recess 136 in the top chord 108 of the tension member 104.

Each stud 142 may be provided with a horizontal opening 146 extending therethrough into which may be inserted key means such as a cotter pin for securing the bottom follower 138 to the tension member 4.

It may be noted that the recess 136 is so designed that when the bottom follower 138 is seated therein the top surface of the bottom wall 140 thereof is just flush with the spring seat surface 122 of the frame.

Likewise, the spring seat 145 of the truck bolster 134 may be depressed as at 148 to take the top wall 150 of the top follower 152, said top wall 150 having the same dimensions as the bottom follower wall 140. The spaced upstanding studs or lugs 154, 154 (Figure 8) may be formed on the upper surface of said top follower wall 150, and similarly arranged as the lugs 142 on the bottom follower wall 140, whereby the friction unit 135 is reversible.

The lugs 154, 154 may extend through the vertical openings 156, 156 in the bottom wall 158 of the bolster 134 which may be of usual box section. Each lug 154 may be provided with the horizontal openings 160 extending therethrough for reception of a pin for securing said top follower to said bolster.

It may be noted that the top and bottom followers are maintained in position by the load-carrying springs 126, certain portions of which may seat against the bottom and top walls 140 and 150 of the followers 138 and 152 respectively adjacent the corners thereof as at 162, 162 as may readily be seen in Figure 7.

The springs 126 may be held in position on the adjacent faces of said top and bottom walls of the top and bottom followers by means of the arcuate depending studs 164, 164 on the top follower wall 150 and the upstanding arcuate studs 166, 166 on the bottom follower wall 140.

The bolster may be interlocked with the columns 106, 106 by means of the plurality of spaced lugs 168, 168 formed on the end of said bolster at opposite sides thereof and said lugs may have arcuate surfaces as at 170, 170 for engagement with complementary surfaces on said columns 106, 106, as best seen in Figure 8. Between the lugs 168, 168 on the bolster 134 may be formed the vertical grooves 172, 172 into which may extend the vertical column lugs 174, 174, said interlocking lugs positioning said bolster with respect to said columns.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. Bolster-supporting means for a railway car truck including a friction device comprising spaced followers, one of said followers having spaced friction surfaces at opposite ends thereof and the other of said followers presenting spaced coplanar diagonal surfaces adjacent each friction surface, a pair of friction shoes in engagement with respective friction surfaces and each having wing portions at opposite sides thereof in complementary engagement with one pair of said diagonal surfaces, resilient means housed in each shoe, extending between the spaced diagonal surfaces of the associated pair, and compressed between the associated shoe and said one follower, and resilient means forming the principal bolster-supporting elements operatively associated with said followers for urging them apart.

2. A friction device comprising a follower with friction surfaces at the ends thereof, another follower projecting between said surfaces and comprising spaced side walls, and an intermediate wall defining a pocket adjacent each surface, the edges of the side walls adjacent each surface sloping therefrom to afford wedge faces angularly related thereto, an external flange on each sloping edge of each side wall forming a part of the wedge face thereon, a friction shoe in each pocket disposed between the associated portions of said side walls for guidable engagement therewith and having ledges extending externally of the pocket and engaging the associated faces, a spring seat on said shoe extending between said side walls, and spring means extending between the first-mentioned follower and said seat for urging the shoe against the related wedge faces and the related surface.

3. A friction device comprising a follower with spaced friction surfaces, another follower with spaced side walls extending between said surfaces, the remote edges of each wall sloping toward each other and being externally flanged to define sloping wedge faces, friction shoe means disposed between and guided by the side walls at each end of the follower, said shoe means having portions extending externally of the space between said side walls for wedge engagement with the associated faces, and spring means reacting against the first-mentioned follower and against said shoe means for urging the latter into engagement with the associated faces and surfaces.

4. In a spring group, spaced spring plates, a coil spring therebetween, and a friction device in parallel with said spring comprising a hollow follower operatively engaged with one of the plates and comprising spaced friction surfaces, another follower engaged with the other plate and comprising spaced side walls, a pair of external flanges on the remote sides of respective side walls adjacent each surface and sloping therefrom to define wedge faces, a friction shoe housed between said side walls at each end of the device in frictional engagement with the associated surface and in wedge engagement with the associated faces, and shoe actuating spring means reacting between said hollow follower and said shoe for urging the latter into said engagement with the associated surfaces and faces, said spring means extending between said side walls and being housed within the shoe.

5. In a spring group, spaced spring plates, a coil spring therebetween, and a friction device in parallel with said spring and comprising a hollow follower operatively engaged with one of the plates and including spaced internal friction surfaces, another follower operatively engaged with the other plate and comprising spaced side walls disposed approximately perpendicular to said surfaces, the edges of said side walls sloping toward said surfaces, sloping external flanges on said side walls merging with said edges, a vertical wall connected to said side walls to define a pocket adjacent each surface, said edges and said flanges defining wedge faces disposed externally of said pockets, a friction shoe in each pocket having a spring seat disposed between said side walls, having spaced ledges in complementary wedge engagement with the related faces, and having frictional engagement with the associated surface, and a spring reacting against the first-mentioned follower and said seat for actuation of said shoe.

6. A friction device comprising a follower with spaced friction surfaces at respective ends of the device, another follower with side walls extending lengthwise of the device between said surfaces, the extremities of said walls sloping toward respective surfaces to define wedge faces disposed externally of the space between said walls, a friction shoe at each end of the device extending between the side walls for guidable cooperation therewith and having portions engageable with the related faces, and spring means extending between the side walls and compressible between the first-mentioned follower and each shoe and housed within the latter to actuate the same into engagement with the related faces and the associated surface.

7. A friction device comprising a follower with spaced friction surfaces at respective ends of the device, another follower with side walls extending lengthwise of the device between said surfaces, the extremities of said walls sloping toward respective surfaces to define wedge faces disposed externally of the space between said walls, a friction shoe at each end of the device extending between the side walls for guidable cooperation therewith and having portions engageable with the related faces, and spring means extending between the side walls and compressible between the first-mentioned follower and each shoe and housed within the latter to actuate the same into engagement with the related faces and the associated surface, and a sloping external flange on each side wall extending along the extremity thereof and defining a portion of the wedge face thereon, the flanges on each side wall being engageable with portions of the first-mentioned follower to limit relative lateral movement between the followers.

ROBERT B. COTTRELL.

REFERENCES CITED

The following references are of record in the file of this patent:

UNITED STATES PATENTS

| Number | Name | Date |
| --- | --- | --- |
| 932,215 | Wilcox | Aug. 24, 1909 |
| 1,374,671 | O'Connor | Apr. 12, 1921 |
| 1,707,490 | O'Connor | Apr. 2, 1929 |
| 1,809,908 | Olander | June 16, 1931 |
| 1,862,766 | O'Connor | June 14, 1932 |
| 2,366,180 | Cottrell | Jan. 2, 1945 |
| 2,368,641 | Cottrell | Feb. 6, 1945 |
| 2,398,700 | Edstrom | Apr. 16, 1946 |
| 2,398,750 | Light | Apr. 16, 1946 |
| 2,403,352 | Edstrom | July 2, 1946 |
| 2,413,458 | Light | Dec. 31, 1946 |